Feb. 6, 1923.
J. GASPARI.
EYEGLASSES.
FILED APR. 3, 1922.
1,444,067
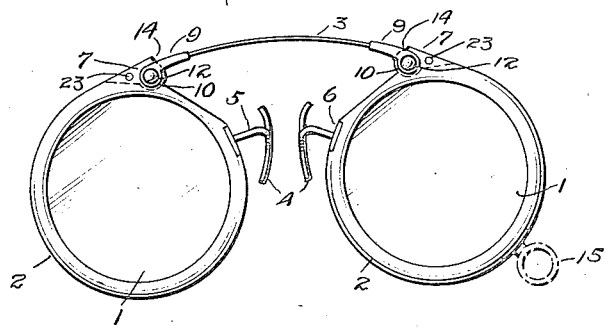
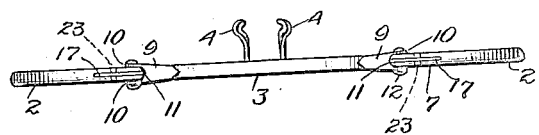
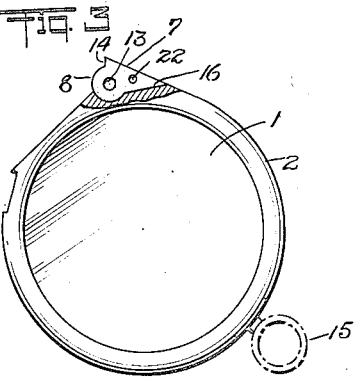
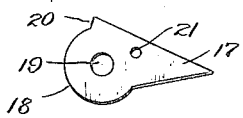
WITNESS
M. E. Lessin
INVENTOR
Joseph Gaspari
BY William F. Nickel
ATTORNEY Patented Feb. 6, 1923.

1,444,067

UNITED STATES PATENT OFFICE.

JOSEPH GASPARI, OF NEW YORK, N. Y.

EYEGLASSES.

Application filed April 3, 1922. Serial No. 549,036.

*To all whom it may concern:*

Be it known that I, JOSEPH GASPARI, a subject of the King of Italy, residing in New York, in the county of New York and State of New York, have invented certain new and useful Improvements in Eyeglasses, of which the following is a specification.

This invention relates to improved eye glasses designed to afford a strong union of the parts which carry the lenses.

An object of this invention is to provide a pair of eye glasses that will permit the use of some relatively weak material now in vogue, such as celluloid colored in imitation of tortoise shell or the like, for the frames encircling the lenses; and at the same time obviate the risk of wear on such frames at the points where they are joined to the nose bridge which connects the two frames together; and likewise remove the danger of the frames breaking at those points, with even more disastrous effect.

Other objects and advantages of this invention are set forth in the following description; taken with the drawings illustrating a preferred embodiment of my invention; and the novel features of my improved eye glasses are defined in the appended claims. This disclosure, however, is explanatory only and I may resort to changes in size, shape, and arrangement of parts, within the scope and spirit of my invention, as the same are indicated by the general meanings of the terms in which the claims are worded.

On the drawings:

Figure 1 is a front view of a pair of eye glasses according to my invention;

Figure 2 is a top view of same;

Figure 3 shows one of the frames for supporting the lenses;

Figure 4 is a top view of what is shown in Figure 3; and

Figure 5 shows a reinforcing element for the lens frames.

The same numerals identify the same parts throughout.

In the particular description of the drawings, 1 indicates the lenses, that are encircled by bands or frames 2, in which these lenses are mounted. The bands 2 are united by a bridge piece 3, and each band carries a nose guard 4 having a shank 5 with a base 6 to enable it to be secured to the outer edge of the frame by screws or rivets or any other suitable fastening means.

At the points where the bridge 3 is united to the bands 2, the bands are each provided with a widened portion 7, at one end of which is a rounded edge 8. Each end of the bridge 3 is secured to a coupling piece 9, having two bent over lugs 10, which project beyond the end of the piece 9 and receive the end of a portion 7 having the edge 8 between them. The portions 7 extend into recesses between the lugs 10 of the pieces 9 as far as the inner ends of the recesses indicated on Figure 2 by the numeral 11; and each of the pieces 9 is secured to one of the bands or frames 2 by means of a pivot pin 12, passing through lugs 10 and a hole 13 in the portion 7, so that the two lenses will be united to each other; and the bands 2 and bridge 3 thus constitute a single mounting to enable the guards 4 of the eye glasses to grip one's nose between them. I provide each portion 7 with a shoulder 14 at the end having the rounded edge 8 and when these ends fit between the lugs 10 of the pieces 9, the shoulders 14 can engage the edges 11. Associated with each pin 12 is a spring (not shown) which makes the connection between the bridge 3 and the bands 2 operate as a spring hinge, moving the lenses apart from each other; so that when the springs take full effect, the shoulders 14 will move into contact with the edges 11 at the end of each piece 9 between the lugs 10, the lenses 2 being then separated a certain distance to enable the guards 4 to engage the sides of the nose and hold the glasses on one's face. In such position the bridge 3 will keep the eye glasses before the eyes, and this bridge will be curved to the extent required to give this result. When the eye glasses are taken off they can be folded together by moving the bands 2 into position to make the lenses overlie each other; the spring hinges provided by the pivot pins 12 then permitting the bands to revolve somewhat on these pins so as to separate the shoulders 14 from the edges 11. When the lens frames 2 are thus superposed, they can be secured by means of a releasable catch. One of the frames will have a handle indicated in broken lines at 15, and the catch may be associated with this handle to engage the other frame 2 and thus prevent the glasses from becoming distended when they are stored away in a case or in one's pocket. The catch is not outlined on the drawings, because this catch, and in fact, all of the parts thus far described are well known to those skilled in this art. The two edges 8 may be curved concentric with the holes 13 if desired.

In practice, it has been found that a good deal of wear takes place at the shoulders 14, when the bands or frames 2 are of celluloid or anything else imitating tortoise shell. In eye glasses of this type the lenses are often permitted to unfold and fly apart suddenly, thus causing the edges 11 to strike sharply against the ends of the portions 8. In consequence the shoulders soon become abraded and worn and the lenses may eventually become separated so much that the nose guards 4 no longer tightly clamp the nose between them to support the glasses on one's face. Obviously the more the shoulders 14 are worn away, the more action of the spring hinges at the pins 10 will move the frames 2 apart so as to separate the nose guards 4; and when this wear has reached a certain point the glasses then become useless. I have likewise found that the imitation shell material of which the lens frames 2 are made will often break at the hole 13, so that the pins 12 can no longer connect the frames to the bridge 3; and this defect also makes the glasses of no further service.

To overcome these drawbacks, I cut away in outer edge of each portion 7 a slot 16 and insert in each of these slots a metal reinforcing element 17. This element has a rounded end 18 which will coincide with the rounded edge 8; and a hole 19 to register with the hole 13; and above the rounded end 18 is a shoulder 20 to coincide with the shoulder 14. When this reinforcing element is put into the slot 16 a rivet secures the element 17 against displacement. The element 17 has a hole 21 and each portion 7 has alined holes 22 in its sides and the rivet 23 goes through these holes maintaining the reinforcing element tightly in position. The end of the reinforcing elements having the edges 18 and shoulders 20 will thus prevent wear upon the shoulders 14; and with the pivot pins 12 in both the holes 13 and holes 19 so as to engage not merely the bands 2 but also the elements 17 as well, the danger of the bridge 3 being broken away from either band is completely removed. By means of a file the shoulders 14 of the bands 2 and the shoulders 20 of the elements 17 can be rasped away if required in any individual instance to space the nose guards 4 farther apart when the lenses are distended. When this adjustment has been made the eye glasses can be used indefinitely because then there can be no further wear on the surfaces of the frames 2 exposed to the action of the edges 11; and there can likewise be no breaking of the pins 12 out from the portions 7, because the elements 17 will hold the pins securely as well as resist wear by the edges 11.

From the foregoing the value and utility of my improvement will be clear, and it is apparent that the extra labor, expense and material entailed by the employment of the reinforcing element are very small.

Of course the shape of the element 17 and of the bottom of the slot 16 can be changed if circumstances demand.

My invention is adapted for use with real tortoise shell, as well as with any imitation thereof, because genuine tortoise shell is quite expensive and a broken frame 2 therefore costs more to replace it.

Having described my invention what I believe to be new and desired to secure and protect by Letters Patent of the United States is:

1. Eye glasses comprising a pair of lenses, frames encircling said lenses, said frames being of some relatively weak material, each of said frames having a widened portion presenting a shoulder, said portions having slots formed therein at their outer edges, a reinforcing element in each of said slots and a nose bridge having its ends connected to said frames at said widened portions and secured to said frames and said elements.

2. A lens frame for eye glasses having a widened portion, said portion having slot cut into its outer edge to receive a reinforcing element to enable a bridge piece to be 1 connected to said portion by a pivot pin passing through the said portion and said reinforcing element.

3. Eye glasses comprising a pair of lenses, frames encircling said lenses, said frames being of some relatively weak material, each of said frames having a portion with a slot formed therein at its outer edge, a reinforcing element in each of said slots and a nose bridge having its ends connected to said frames at said portions and secured to said frames and said elements.

In testimony whereof, I have signed my name to this specification this 31st day of March, 1922.

JOSEPH GASPARI.